United States Patent
Hashikura et al.

(10) Patent No.: US 7,090,394 B2
(45) Date of Patent: Aug. 15, 2006

(54) TEMPERATURE GAUGE AND CERAMIC SUSCEPTOR IN WHICH IT IS UTILIZED

(75) Inventors: Manabu Hashikura, Itami (JP); Hirohiko Nakata, Itami (JP); Masuhiro Natsuhara, Itami (JP); Akira Kuibira, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/605,519

(22) Filed: Oct. 6, 2003

(65) Prior Publication Data

US 2004/0208228 A1   Oct. 21, 2004

(30) Foreign Application Priority Data

Oct. 8, 2002   (JP) ............................. 2002-294399

(51) Int. Cl.
    *G01K 7/00*   (2006.01)
(52) U.S. Cl. ..................... 374/179; 374/208; 374/141
(58) Field of Classification Search ................ 374/179, 374/208, 163, 100, 141; 136/221, 230
    See application file for complete search history.

(56) References Cited

U.S. PATENT DOCUMENTS

| | | | | |
|---|---|---|---|---|
| 2,625,573 A | * | 1/1953 | Connell | 136/230 |
| 2,829,185 A | * | 4/1958 | Macatician et al. | 136/228 |
| 3,376,169 A | * | 4/1968 | Davis et al. | 136/230 |
| 3,376,170 A | * | 4/1968 | Logan et al. | 136/233 |
| 3,751,305 A | * | 8/1973 | Huebscher | 136/221 |
| 4,259,123 A | * | 3/1981 | Tymkewicz | 136/221 |
| 4,749,415 A | * | 6/1988 | Barton | 136/230 |
| 4,904,091 A | * | 2/1990 | Ward | 374/179 |
| 4,963,194 A | * | 10/1990 | Mele | 136/221 |
| 5,427,452 A | * | 6/1995 | Stuart | 374/179 |
| 5,876,119 A | * | 3/1999 | Ishikawa et al. | 374/134 |
| 5,951,165 A | * | 9/1999 | Platt | 374/179 |
| 6,084,215 A | * | 7/2000 | Furuya et al. | 219/444.1 |
| 6,239,351 B1 | * | 5/2001 | Hall, Jr. | 136/227 |
| 6,257,758 B1 | * | 7/2001 | Culbertson | 374/120 |
| 6,481,886 B1 | * | 11/2002 | Narendrnath et al. | 374/141 |
| 2002/0027942 A1 | * | 3/2002 | Nishijima et al. | 374/45 |
| 2004/0004990 A1 | * | 1/2004 | Khan | 374/161 |

FOREIGN PATENT DOCUMENTS

| | | | |
|---|---|---|---|
| JP | 61039540 A | * | 2/1986 |
| JP | S61-223523 | | 10/1986 |

(Continued)

*Primary Examiner*—Diego Gutierrez
*Assistant Examiner*—Mirellys Jagan
(74) *Attorney, Agent, or Firm*—James W. Judge

(57) ABSTRACT

Temperature gauge, and ceramic susceptors and semiconductor manufacturing equipment utilizing the temperature gauge, in which the thermocouple may be easily replaced even if damaged, and in which heat from the temperature-gauging site is readily transmitted to the temperature-gauging contact, shortening time until the measurement temperature stabilizes. A temperature-gauging contact (12) in the tip of the thermocouple contacts, in an exposed-as-it-is state, a temperature-gauging site on a ceramic susceptor (1), and by means of a circular cylindrical-shaped retaining member (11) screwed into female threads in the ceramic susceptor (1) is detachably pressed upon and retained against the ceramic susceptor. Thermocouple lead lines (13), passing through a through-hole (14) in the retaining member (11), stretch from one end face to the other end face thereof. The retaining member may be provided with a flange having threaded holes and screwlocked into female screws in the ceramic susceptor.

16 Claims, 4 Drawing Sheets

FOREIGN PATENT DOCUMENTS

| | | | |
|---|---|---|---|
| JP | 03261834 A * | 11/1991 |
| JP | H04-011445 | 1/1992 |
| JP | H05-206030 | 8/1993 |
| JP | H06-241913 | 9/1994 |
| JP | H07-294339 | 11/1995 |
| JP | 2525974 B2 | 8/1996 |
| JP | 2644660 B2 | 8/1997 |
| JP | 2001-85143 A | 3/2001 |
| JP | 2001-85144 A | 3/2001 |
| JP | 2001-244049 A | 9/2001 |
| JP | 2002-164291 A | 6/2002 |

* cited by examiner

TEMPERATURE GAUGE AND CERAMIC SUSCEPTOR IN WHICH IT IS UTILIZED

BACKGROUND OF INVENTION

1. Field of the Invention

The present invention relates to temperature gauges for ceramic susceptors that are installed in semiconductor manufacturing equipment, and to ceramic susceptors, as well as semiconductor manufacturing equipment, utilizing the temperature gauges.

2. Description of the Background Art

Ceramic susceptors (also called wafer holders) formed from an inorganic insulating material such as a ceramic of high thermal conductivity, and in which a resistive heating element is embedded, have been employed to date in semiconductor manufacturing equipment such as CVD devices and plasma CVD devices, for example, for uniformly heating wafers on which film-forming or like processes are carried out.

In order to control the heating temperature by varying the amount of voltage and current applied to the resistive heating element, a plurality of terminals connected to the resistive heating element is furnished exposed on a face of the susceptor apart from its wafer-heating face, and the terminals and an external power source are connected by lead lines. Likewise, in order to control the temperature of the ceramic susceptor itself, a thermoelectrically matched temperature measuring component is furnished exposed on a face apart from the wafer-heating face.

With the enlarging in diametric span of wafers lately, severe demands are being placed on the temperature-control regimen for the wafer-heating face of ceramic susceptors in order to improve product yields in semiconductor manufacturing equipment. Consequently, uniformly and precisely controlling the temperature of the wafer-heating face is necessary, and temperature-measuring accuracy in the temperature-measuring components that control the output from the resistive heating element has become crucial.

Nevertheless, in measuring temperature within the reaction chambers in semiconductor manufacturing equipment, accurate temperature measurement has been difficult because the behavior of gas molecules in the temperature-measuring component environs is altered on account of pressure fluctuations stemming from the introduction and discharge of reaction gases, drastically changing how the molecules move thermally. Moreover, in cases in which the location where the temperature-measuring components are installed is remote from the wafer-heating face, the measurement temperature departing from the actual wafer temperature leads to a pronounced temperature gradient, which consequently has, depending on the case, invited circumstances in which the wafer is damaged by thermal stress.

In Japanese Pat. Pub. No. 2,644,660, for example, this is dealt with by providing a sheath in which a thermocouple is fixed and male threads on the tip portion of the sheath, which is made of metal, and by providing female threads in the ceramic susceptor, in a face of apart from its wafer-heating face, or in matter consisting of metal, ceramic, etc. embedded therein, with the male threads furnished on the tip portion for the thermocouple being screwed together with and fixed into the female threads. This enlarges the surface area in which the thermocouple and the ceramic susceptor are in direct contact, and at the same time because they are fixed by being screwed together their state of contact is unlikely to change, whereby the temperature measuring accuracy can be improved. Furthermore, the thermocouple itself is detachable/replaceable.

In other ceramic susceptor examples, proposed in Japanese Pat. App. Pub. No. 2001-244049, Japanese Pat. App. Pub. No. 2001-85143, and Japanese Pat. App. Pub. No. 2001-85144, departure between measurement temperature and wafer temperature is prevented by establishing bottomed holes, directed from the side opposite the wafer-heating face to the heating face and into which a thermocouple is inserted, and making the bottoms of the bottomed holes relatively nearer the wafer-heating face than the heating element. In addition the thermocouples are resin-sealed inside the bottomed holes after being joined into them with a brazing material, or are fixed inside the bottomed holes by filling them in with an insulating material such as a heat-resistant resin or a ceramic.

In a further ceramic susceptor example, Japanese Pat. App. Pub. No. 2002-164291, a recess whose aperture surface area is 1.0 to 30 $mm^2$, whose depth d is, with respect to the thickness t of the heater, $t/4 \leq d \leq 3t/4$ is formed in the face on the side opposite the surface-heating side, and a thermocouple whose filament diameter is 0.05 to 1.0 mm and the tip portion of which is equipped with a temperature-gauging contact is inserted and adhesively fixed by means of a filler into the recess. That the temperature-measuring responsiveness is thereby improved, reducing transient temperature irregularities when heating a wafer and shortening the time until the temperature stabilizes is therein proposed.

A drawback with the ceramic susceptors set forth in the publications discussed above has been that with heat from the temperature-gauging site on the ceramic susceptor not being readily transmitted to the temperature-gauging contact, owing to the presence, surrounding the temperature-gauging contact that is on the tip of the thermocouple, of the sheath, the embedded matter consisting of metal or ceramic, or the insulating material or filler material consisting of a heat-resistant resin or ceramic, it takes time for the measurement temperature to stabilize.

Another problem has been that the temperature-measuring element generally employed in thermocouples is thin-gauge because it must be confined within limited space, and consequently the temperature-measuring element, undergoing impact on the device itself or thermal shock when wafers are heated, is in some cases damaged. With the ceramic susceptors set forth in the disclosures in Japanese Pat. App. Pub. No. 2001-244049, Pat. App. Pub. No. 2001-85143, Pat. App. Pub. No. 2001-85144, and Pat. App. Pub. No. 2002-164291, in particular, because the temperature-measuring element is fixed by being joined or embedded in place, replacing the entire ceramic susceptor is necessary if the temperature-measuring element has been damaged, which has made the replacement work a large-scale undertaking, and on top of that the costs attendant on replacement have been great.

SUMMARY OF INVENTION

An object of the present invention, in view of such circumstances to date, is to render a temperature gauge in which simple replacement of the thermocouple even if damaged is possible, and moreover in which heat from the temperature-gauging site is readily transmitted to the temperature-gauging contact, shortening time until the measurement temperature stabilizes. In addition, the present invention realizes ceramic susceptors and semiconductor manufacturing equipment utilizing a temperature gauge of this sort.

In order to achieve the foregoing objective, a temperature gauge that the present invention realizes is characterized in that a temperature-gauging contact in the tip of the thermocouple contacts in an exposed-as-it-is state, and by being mechanically, detachably pressed upon is retained against, the temperature-gauging site on an article subjected to temperature gauging.

The foregoing temperature gauge by the present invention preferably is characterized in that the temperature-gauging contact in the thermocouple tip is clamped in between a retaining member and a gauging subject that screw into, or are screwlocked to, each other.

The foregoing temperature gauge by the present invention is in specific aspects characterized in that the aforementioned retaining member is a circular cylindrical form having male threads in its lateral surface, and by means of the male threads is screwed together with female threads provided in the gauging subject, whereby with one end face of the retaining member the temperature-gauging contact is pressed onto the gauging subject; or else is characterized in that the retaining member has, along one end thereof, a flange portion provided with threaded holes and that is screwlocked into female screws provided in a surface of the gauging subject.

In the foregoing temperature gauge by the present invention, the retaining member has a through-hole penetrating from one end face to the other end face thereof, wherein lead lines from the thermocouple can be passed into the through-hole. Alternatively, the retaining member is in an end face thereof furnished with a recess into which a communicating through-hole opens, wherein the temperature-gauging contact in the thermocouple tip and the lead lines that go along with it can be housed in the recess. Moreover, the depth of the recess preferably is less than the diameter of the thermocouple lead lines.

Also preferable in the foregoing temperature gauge by the present invention is that a tubular member for accommodating the thermocouple lead lines is either joined to or is furnished integrally with the other end face of the retaining member. In addition, either the other end face of the retaining member, or along its distal end the tubular member, joined to or otherwise furnished integrally with the retaining member, is preferably sealed gastight by means of a sealing member. Still further, the thermal expansion coefficient of the retaining member preferably is about equal to the thermal expansion coefficient of the gauging subject.

The present invention likewise renders ceramic susceptors characterized in being furnished with an above-described temperature-gauging device by the present invention. Furthermore, the present invention realizes semiconductor manufacturing equipment characterized in being fitted out with such ceramic susceptors.

From the following detailed description in conjunction with the accompanying drawings, the foregoing and other objects, features, aspects and advantages of the present invention will become readily apparent to those skilled in the art.

DETAILED DESCRIPTION

Figure 1:
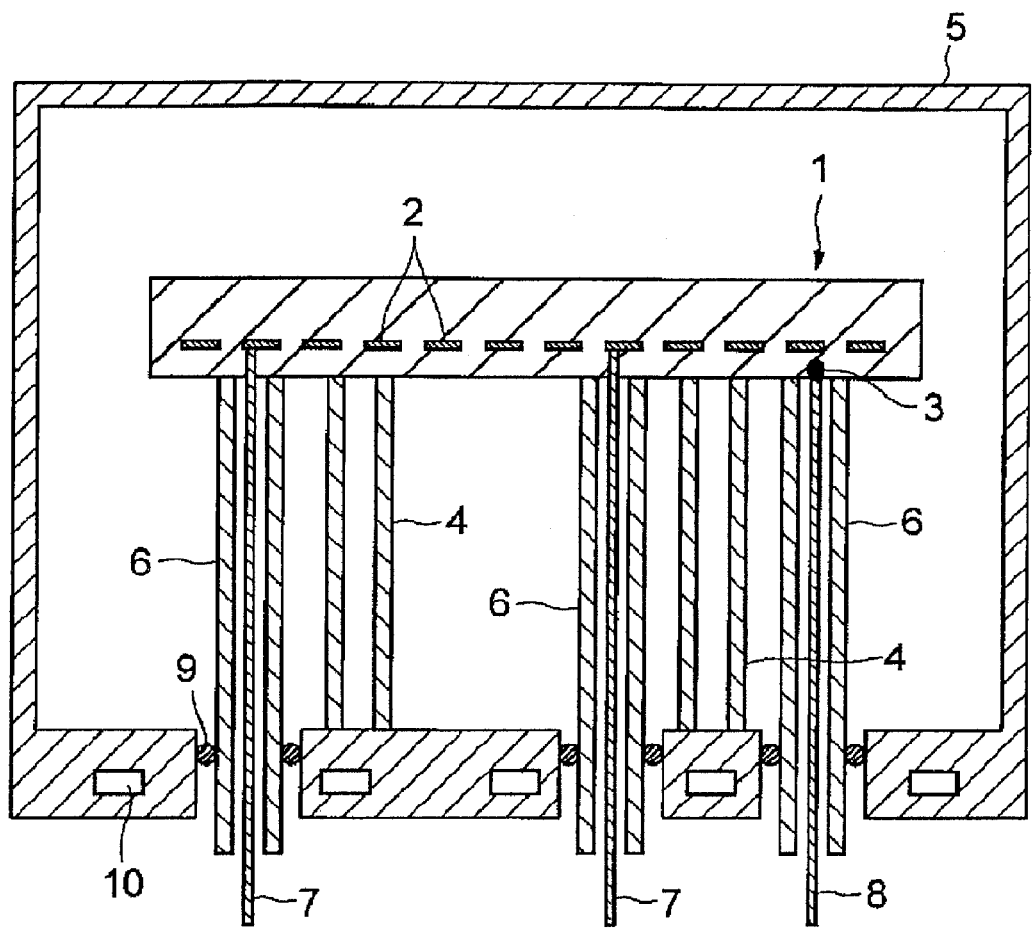
FIG. 1 is a sectional view in outline illustrating a specific example of semiconductor manufacturing equipment utilizing a common ceramic susceptor.

An example of a semiconductor manufacturing tool equipped with a ceramic susceptor in a principal utilization of a temperature gauge is illustrated in FIG. 1. The ceramic susceptor 1, which is formed of a ceramic having a high thermal conductivity such as aluminum nitride, has embedded within it a resistive heating element 2, and is provided with a thermocouple 3 for controlling its temperature. The ceramic susceptor 1 is set up in place within a reaction chamber 5 by means of support members 4, and lead wires 7 for supplying electricity to the resistive heating element 2, and a lead 8 from the thermocouple 3 are accommodated within tubular members 6. Gaps between the bottom portions of the tubular members 6 and the reaction chamber 5 are sealed gastight with O-rings 9, and also in the bottom portion of the reaction chamber 5 water-cooling devices 10 are furthermore provided.

With a temperature gauge in the present invention, the ceramic susceptor in such semiconductor manufacturing tools is made the gauging subject, and a temperature-gauging contact in the tip of the thermocouple contacts, in an exposed-as-it-is state, and by being mechanically pressed upon is retained against, a temperature-gauging site on the gauging subject.

As a result of concerted investigations regarding the time for the temperature being measured with a thermocouple to stabilize, the present inventors learned that with temperature gauges in conventional ceramic susceptors, due to the intervention of, surrounding the temperature-gauging contact in the thermocouple tip, the sheath, the embedded matter consisting of metal or ceramic, or the insulating material or filler material consisting of a heat-resistant resin or ceramic, heat from the temperature-gauging site is not readily transmitted to the temperature-gauging contact on account of these intervening objects, and it takes time until the measurement temperature is steady.

They also learned that if space is present surrounding the temperature-gauging contact in the thermocouple tip, as in cases where the thermocouple-tip temperature-gauging contact is directly inserted into the gauging subject, due to reaction gas invading the space, the heat capacity grows larger by that of the reaction gas, and consequently, owing to effects multiplied with those of the intervening objects just mentioned, responsiveness when gauging temperature worsens further.

To address these issues, three means have been adopted in the present invention in order to heighten the responsiveness: (1) the temperature-gauging contact in the thermocouple tip is left exposed as it is, without being covered by a sheath or the like; (2) the temperature-gauging contact is directly contacted on the temperature-gauging site in the gauging subject; and (3) the temperature-gauging contact is fixed by being pressed onto the gauging subject mechanically.

By adopting this configuration, in a temperature gauge of the present invention, the fact that with the thermocouple temperature-gauging contact directly contacting the temperature-gauging site in an exposed as-it-is state, intervening objects such as a sheath or embedded matter, or else an insulating material or filler, are not present between means that heat from the temperature-gauging site in a ceramic susceptor or like gauging subject is readily transmitted to the temperature-gauging contact, curtailing, over what has conventionally been the case, the time until the measurement temperature stabilizes and heightening the responsiveness. Meanwhile, although space is present surrounding the temperature-gauging contact, because heat from the temperature-gauging site is transmitted directly to the temperature-gauging contact, no depreciation in responsiveness is incurred.

What is more, with a temperature gauge of the present invention, inasmuch as the thermocouple is detachably retained against the gauging subject even in cases where the thermocouple undergoes impact on the device itself, or thermal shock when wafers are heated, and is damaged it can be easily replaced by removing the damaged thermocouple alone. The gauging subject, such as a ceramic susceptor, may therefore be reused as such, which enables the costs attendant on replacement to be kept significantly under control.

As means in the present invention for detachably retaining the thermocouple in an exposed as-it-is state against the gauging subject, it is preferable to utilize a retaining member to press the temperature-gauging contact in the thermocouple tip onto, and clamp it together with, the gauging subject, and either to screw the retaining member and the gauging subject together by mutually threaded portions in each, or to provide threaded holes in each and screwlock them.

Next, a temperature gauge by the present invention will be specifically explained with reference to the drawings. It should be understood that components that are the same as those of the example illustrated in FIG. 1 are labeled with identical reference mark, and explanation thereof is omitted.

Figure 2:
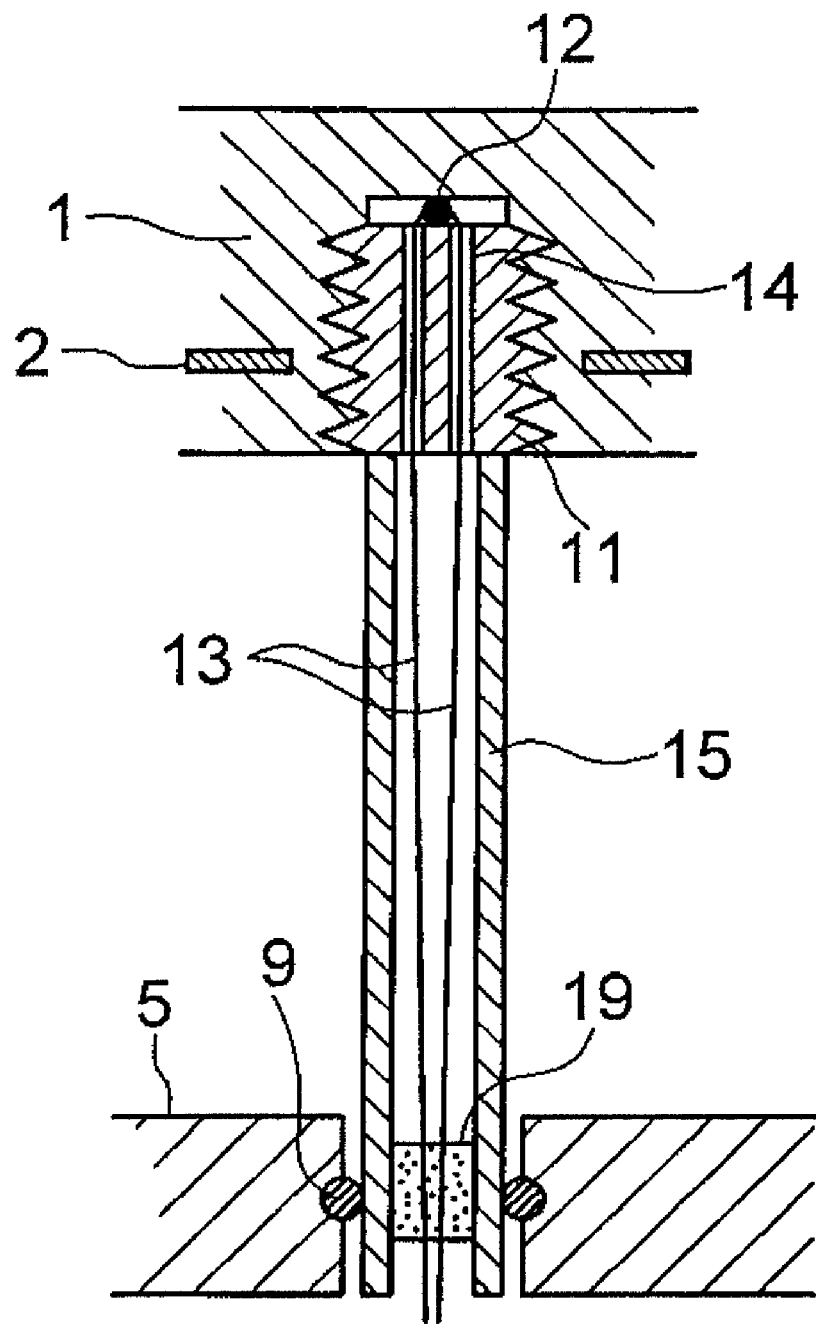
FIG. 2 is a sectional view in outline illustrating one specific example of a temperature gauge according to the present invention.

To begin with, in the temperature gauge illustrated in FIG. 2, employing a retaining member 11 of circular cylindrical form having male threads in its lateral surface and screwing the male threads into a female screw provided in the face of the ceramic susceptor 1 on the side opposite its wafer-heating face, makes it so that the temperature-gauging contact 12 in the thermocouple tip is clamped in between one end face of the retaining member 11 and the bottom face of the female screw in the ceramic susceptor 1, and is pressed onto the ceramic susceptor 1.

A through-hole 14 is provided in the retaining member 11, penetrating it from one end face to the other end face, enabling lead lines 13 that go along with the temperature-gauging contact 12 in the thermocouple tip to pass through the through-hole 14 and lead out of the other end face. In turn, a tubular member 15 is joined to the other end face of the retaining member 11, enabling the lead lines 13 from the thermocouple to be accommodated within the tubular member 15. It will be appreciated that for the tubular member 15, a separate component of a material that is the same as or different from that of the retaining member 11 may, as depicted in the figure, be joined to the retaining member 11 using glass or a brazing material, and also can be formed unitarily with the retaining member 11 using an identical substance.

Figure 3:
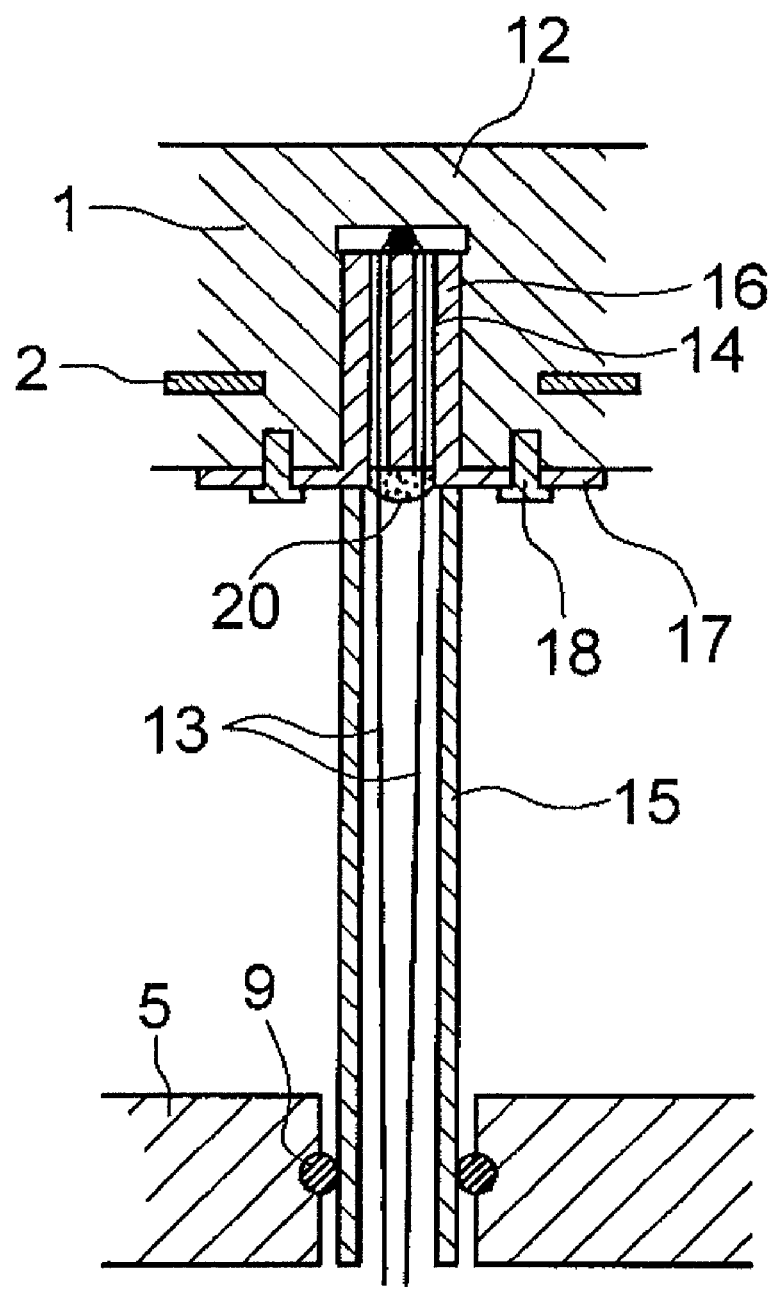
FIG. 3 is a sectional view in outline illustrating a separate specific example of a temperature gauge according to the present invention.

Alternatively, in the temperature gauge illustrated in FIG. 3 a flange 17 having threaded holes is provided along the distal end of a columnar retaining member 16, and the retaining member 16 is inserted into an insertion hole provided in the face of the ceramic susceptor 1 on the side opposite its wafer-heating side, wherein male screws 18 are screwed into and screwlock the threaded holes in the flange 17 and female screws furnished in the ceramic susceptor 1. The temperature-gauging contact 12 in the thermocouple tip is thereby clamped in between the proximal-end face of the retaining member 16 and the bottom face of the insertion hole in the ceramic susceptor 1, and pressed onto the ceramic susceptor 1.

Here, in the specific example of FIG. 3 as well, that the retaining member 16 has the through-hole 14 for passing the lead lines 13, and that the tubular member 15 may be joined to or furnished unitarily with the distal-end face of the retaining member 16 are likewise as in the FIG. 2 case. It should also be understood that although a columnar retaining member 16 is exemplified in FIG. 3, utilizing a plate-shaped retaining member to press the temperature-gauging contact onto the face of the ceramic susceptor on the side opposite the wafer-heating face is also possible.

It will be appreciated that in a semiconductor manufacturing tool, the reaction chamber inside must be made an ambient distinct from the atmospheric ambient of the exterior. For that reason, when utilizing the temperature gauge of the present invention, in situations where as shown in FIGS. 2 and 3 the thermocouple lead lines 13 are accommodated within the tubular member 15, the inter-space between the tubular member 15 along its distal end, and the reaction chamber 5 is sealed gastight with the O-ring 9. Meanwhile, in cases where such a tubular member is not employed, the interspace between the thermocouple lead lines along their distal ends and the reaction chamber should be sealed gastight with a heat-resistant resin or the like.

On the other hand, because in the present invention there is a through-hole in the retaining member for the thermocouple lead lines passing the through hole, the interior of the tubular member ends up being the atmospheric ambient external to the reaction chamber. That is because a gastight condition within the reaction chamber cannot be maintained the interior of the tubular member must also be made gastight with respect to the reaction chamber exterior. In that regard, in cases where, as shown in FIG. 2 for example, the thermocouple lead lines 13 are accommodated in the tubular member 15 the lead lines 13 along their distal ends in the interior of the tubular member 15 should be sealed gastight with sealing stuff 19 of a heat-resistant resin or the like.

By the same token, as shown in FIG. 3, the distal-end face of the retaining member 16 can, including the through-hole 14, be sealed gastight by means of sealing stuff 20 whose thermal expansion coefficient is the same as, or approximately that of, the lead lines 13. It should be understood that applying the gastight seal made by the sealing stuff 20 in FIG. 3 also to cases where no tubular member is utilized is possible. Here, while FIGS. 2 and 3 are specific examples, the form of and fastening means for the retaining member, as well as the tubular member presence/absence, and the gastight sealing method are of course freely combinable.

Figure 4:
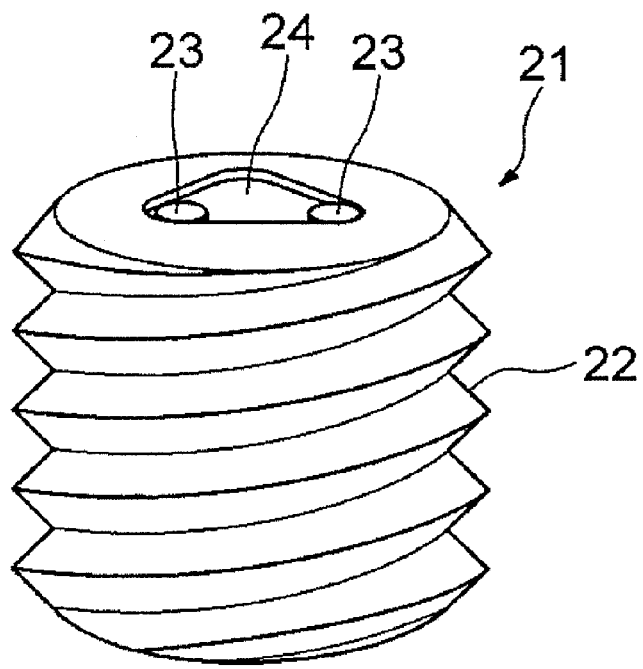
FIG. 4 is an oblique view in outline illustrating one specific example of a retaining member utilized in a temperature gauge of the present invention.
Figure 5A:
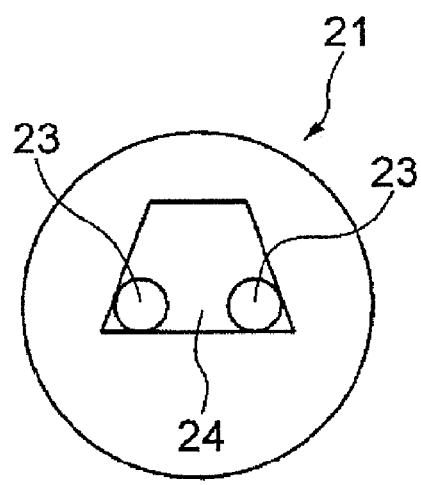
FIGS. 5A and 5B are plan views in outline illustrating respectively one end face and the other end face of the retaining member represented in FIG. 4.
Figure 5B:
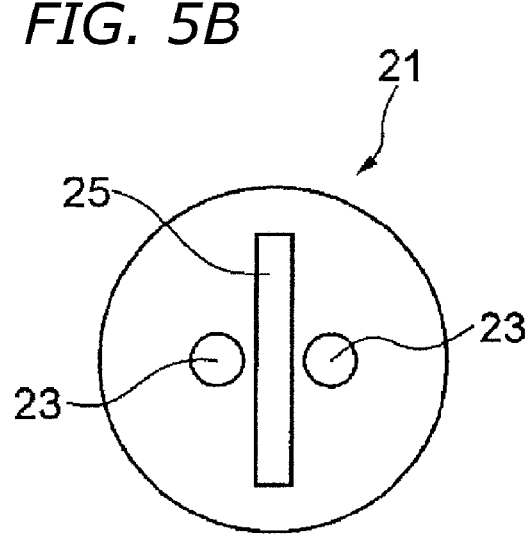

Preferred specific examples of retaining members utilized in the present invention for the temperature-gauging contact will be explained according to FIGS. 4 and 5. Here a retaining member 21 as depicted in FIG. 4 has male threads 22 in its lateral surface, and penetrating from the proximal-end face to the distal-end face thereof two through-holes 23 for passing the thermocouple lead lines are provided. In addition, as shown in FIG. 4 and FIG. 5A, a recess 24 is provided in the proximal-end face of the retaining member 21 so as to contain the two through-holes 23, wherein the thermocouple temperature-gauging contact, and the lead lines that go along with it, can be housed in the recess 24. Moreover, as illustrated in FIG. 5B a groove portion 25 for being turned by a screwdriver or the like when the retaining member 21 is screwed into place can be provided in the center of its distal-end face, in between the two through-holes 23 penetrating from the proximal-end face thereof.

It is desirable that the recess 24 provided in the proximal-end face of the retaining member 21 in depth be less than the diameter of the thermocouple lead lines. Making the depth of the recess 24 less than the diameter of the lead lines, enables the temperature-gauging contact in the thermocouple to be pressed surely against the temperature-gauging site in the ceramic susceptor when attaching the retaining member 21 to the ceramic susceptor by such means as screw-joining with a female screw therein. Likewise, it is desirable that the thermocouple lead lines where in between the retaining member and the bottom portion of the reaction chamber be put into thermally resistant coverings or protective tubes with a through hole, so that the lead lines do not come into contact with each other.

The thermal expansion coefficient of the retaining-member substance desirably is about equal to the thermal expansion coefficient of the substance constituting the ceramic susceptor that is the gauging subject. Minimizing the difference in thermal expansion coefficient between the retaining member and the ceramic susceptor makes it possible to deter incidents of cracking in the screw joint during heating due to difference in thermal expansion coefficient.

Here, as far as the thermocouple is concerned models K, R, B, S, E, J and T as given by JIS (Japanese Industrial Standard) C 1602 (1980) are available, and application may be with any of these thermocouples.

In a ceramic susceptor utilizing a temperature gauge of the present invention, output from the resistive heating element is controlled by gauging the susceptor temperature in a brief interval, enabling the susceptor to be maintained at a precise temperature while preserving the isothermal quality of its heating face. What is more, the fact that the thermocouple alone can easily be replaced, even in cases where the thermocouple has been damaged, by undoing the retaining member from the ceramic susceptor is advantageous in terms of efficiency and economy.

EMBODIMENTS 0.5 parts by weight yttria ($Y_2O_3$) as a sintering additive was added to 100 parts by weight aluminum nitride (AlN) powder, and was further combined with a predetermined amount of an organic extrusion binder; and after mixing these ingredients using a ball-mixing method the blend was granulated by spray-drying. The obtained granulated powder was molded by means of a uniaxial press into 2 disk forms whose post-sintering dimensions were 350 mm diameter×10 mm thickness. The 2 disk-shaped molded objects were degreased within a nitrogen atmosphere 900° C. in temperature and furthermore sintered 5 hours at a temperature of 1900° C. within a nitrogen atmosphere. The thermal conductivity of the AlN sinters produced was 170 W/mK. The entire surface of the AlN sinters was polished using a diamond abrasive.

A slurry in which a sintering additive and an ethyl-cellulose binder were added into and knead-mixed with tungsten powder was used to print a resistive-heating-element circuit superficially onto one of the disk-shaped AlN sinters, which after degreasing within a 900° C. nitrogen atmosphere were baked by being heated 1 hour at 1850° C. A slurry in which an ethyl-cellulose binder was added to and knead-mixed with a bonding glass was spread onto the other disk-shaped AlN sinter, which was degreased within a 900° C. nitrogen atmosphere. The bonding-glass face and the resistive-heating-element face of the two AlN sinter plies were stacked together, and while put under a displacement-prevention load of 5 kg/cm$^2$ were bonded together being heated 2 hours at 1800° C., whereby ceramic susceptors interiorly in which a resistive heating element was embedded were fabricated.

Tungsten electrode terminals connected to the resistive heating element were bonded to the side (reverse face) of the ceramic susceptors opposite the heating face, and furthermore electric power-supplying lead wires electrically connected to a system-external power source were connected to the electrode terminals. The electrode terminals and the lead wires were accommodated in the interior of a tubular member made from a mullite sinter having a thermal conductivity of 1 W/mK, and then a B—Si bonding glass was spread onto one end face of the tubular member, which was put onto the reverse face of the ceramic susceptor, and while put under a displacement-prevention load of 50 g/cm$^2$ they were bonded together by being heated 1 hour at 800° C.

In addition, after knead-mixing a blend utilizing the same AlN powder as that used when the AlN sinters described above were manufactured, with the sintering additive composition being the same, and further combined with an organic extrusion binder, a dispersing agent, and a solvent, a round columnar form whose post-sintering dimensions were 10 mm outside diameter×8 mm length was molded by extrusion molding the blend. The round-columnar molded object was degreased and sintered under the same conditions as during the manufacture of the foregoing AlN sinters, whereby AlN sinters whose the thermal conductivity was 170 W/mK were obtained. A through-hole for lead lines was provided longitudinally penetrating the round-columnar AlN sinter, and on the lateral surface thereof a male-threading process was carried out, thereby rendering a retaining member made of AlN. Furthermore a recess into which a communicating through-hole opens was machined into one end face of the retaining member. Afterwards a tubular member made from a mullite sinter, 10 mm outside diameter×8 mm inside diameter×100 mm length, was joined to the other end face of the retaining member using a B—Si glass.

In turn, a thermocouple insertion hole, 8 mm diameter×10 mm depth, having female threads was bored into the face on the reverse of the heating face of the foregoing ceramic susceptor. Meanwhile, heat-resistant coated lead wires for a K-type thermocouple were passed through the through-hole in the retaining member just described, and a temperature-gauging contact was set onto the distal-end face of the retaining member. The temperature-gauging contact was pressed by the retaining member onto the ceramic susceptor by inserting the retaining member heading from its distal-end face into thermocouple insertion hole in the ceramic susceptor and screwing the two together. After that, the interspace between the thermocouple lead lines along their distal end and the tubular member interior, was immobilized with a heat-resistant resin in order to form a gastight seal between the interior of the tubular member joined to the distal end of retaining member, and the exterior of reaction chamber.

In addition, approximately circular tube-shaped support members, made from a mullite sinter 10 mm outside diameter×8 mm inside diameter×100 mm length and provided with a flange on either end were fabricated the flanges along the distal ends of this plurality of approximately circular tube-shaped support members were fixed to the bottom face of the reaction chamber, and a ceramic susceptor fabricated as described above was set in place atop, without being joined to, the flanges along the proximal ends. The tubular members joined to the reverse face of the ceramic susceptor and the distal-end face of the retaining member were all sealed gastight along their respective distal ends by means of O-rings in between them and the bottom face of the reaction chamber.

In respect of a ceramic susceptor Sample 1 to which a temperature gauge according to the present invention example, fabricated as stated above, its reaction chamber interior was drawn down to a vacuum ($10^{-2}$ Pa or less) and the ceramic susceptor was heated to a temperature of 500° C. An operation of in that sate introducing $N_2$ gas into the chamber until the internal pressure was 1 atmosphere and once more discharging the chamber down to a vacuum was repeated for 10 cycles, and respectively during introduction and during discharge of the gas the time (average) until the case-monitor temperatures stabilized was measured. It should be understood that in making these measurements, a disk-shaped block made from a substance having a large heat capacity was set onto the wafer-heating face of the ceramic susceptor in order to eliminate variation in the temperature of the susceptor itself.

For comparison, a K-type thermocouple as noted in the following was attached to a ceramic susceptor like that in the foregoing. Namely, prepared were: Sample 2, in which a temperature-gauging contact on a K-type thermocouple with a sheath made of SUS steel attached was inserted into a thermocouple insertion hole in a ceramic susceptor; Sample 3, in which a temperature-gauging contact on a K-type thermocouple with a sheath made of SUS steel attached was bonded with glass into a thermocouple insertion hole; and Sample 4, in which a temperature-gauging contact on a K-type thermocouple (no sheath) was inserted and embedded with glass into a thermocouple insertion hole.

With regard to these Samples 2 through 4 also, the time (average) until the measurement temperature stabilized was found in the same manner as with the foregoing Sample 1, and the results are set forth, together with those for Sample 1, in the table below. As will be understood from the table, present-invention Sample 1, in which a K-type thermocouple was pressed onto a ceramic susceptor by a retaining member screwed together there-with yielded stabilizing times about equal to those that were the case with Sample 4, wherein the temperature-gauging contact was embedded with glass so as not to undergo any pressure fluctuation whatsoever within the reaction chamber.

TABLE

| Sample | Measurement temp. stabilizing time (average) During gas introduction | Measurement temp. stabilizing time (average) During gas discharge |
|---|---|---|
| 1 | 2 sec. | 2 sec. |
| 2* | 32 sec. | 21 sec. |
| 3* | 11 sec. | 9 sec. |
| 4* | 3 sec. | 2 sec. |

Note: Samples marked with an asterisk (*) in the table are comparative examples.

As given by the present invention, a temperature gauge may be realized in which because the thermocouple is detachable, easy replacement of the thermocouple even if damaged is possible, and meanwhile in which, with heat from the temperature-gauging site on a gauging subject being readily transmitted to the temperature-gauging contact, time until the measurement temperature stabilizes is short. Accordingly, utilizing a temperature gauge of the present invention, ceramic susceptors and semiconductor manufacturing equipment in which the ceramic susceptors are utilized may be realized wherein thermocouple replacement is facilitated, and wherein with output from the resistive heating element being controlled by temperature being gauged in a brief interval, the ceramic susceptors can be maintained at a precise temperature while their isothermal quality is preserved.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A ceramic susceptor including a temperature gauge for gauging the temperature of a temperature-gauging site in the susceptor, the temperature gauge comprising:
   a thermocouple having a tip end;
   a temperature-gauging contact exposed in the tip end of said thermocouple and contacting, exposed as it is, the temperature-gauging site in the susceptor; and
   a detachable retaining member that either screws together with or is screwlocked into the susceptor, for clamping said temperature-gauging contact in between said retaining member and the susceptor, thereby mechanically pressing upon said temperature-gauging contact to retain it against the temperature-gauging site, said retaining member in an end face thereof being furnished with a recess into which a communicating through-hole opens, so that said temperature-gauging contact in the thermocouple tip and lead lines accompanying said contact can be housed in the recess, and said recess in depth measuring less than the thermocouple lead lines in diameter.

2. A ceramic susceptor including a temperature gauge as set forth in claim 1, female screws being provided in a surface of the susceptor, wherein said retaining member has, along one end thereof, a flange portion provided with threaded holes for screwlocking said retaining member into the female screws in the susceptor.

3. A ceramic susceptor including a temperature gauge as set forth in claim 1, wherein the retaining member has a through-hole penetrating from one end face to the other end face thereof so that lead lines from the thermocouple can be passed into the through-hole.

4. A ceramic susceptor including a temperature gauge as set forth in claim 1, further comprising a tubular member, either joined to or furnished integrally with an end face of said retaining member opposite where said temperature-gauging contact is clamped, for accommodating lead lines from said thermocouple.

5. A ceramic susceptor including a temperature gauge as set forth in claim 1, wherein the thermal expansion coefficient of said retaining member is about equal to the thermal expansion coefficient of the susceptor.

6. A ceramic susceptor including a temperature gauge as set forth in claim 1, female threads being provided in the susceptor, wherin said retaining member is a circularly cylindrical form having male threads in its lateral surface for screwing said retaining member together with the female threads in the susceptor so that one end face of the retaining member presses said temperature-gauging contact onto the susceptor.

7. A ceramic susceptor including a temperature gauge as set forth in claim 6, wherein the other end face of said circularly cylindrical retaining member has a groove for being turned by a turning tool when said retaining member is screwed together with the susceptor.

8. Semiconductor manufacturing equipment furnished with a ceramic susceptor as recited in claim 1.

9. A ceramic susceptor including a temperature gauge for gauging the temperature of a temperature-gauging site in a susceptor subjected to temperature gauging, the temperature gauge comprising:
a thermocouple having a tip end;
a temperature-gauging contact exposed in the tip end of said thermocouple and contacting, exposed as it is, the temperature-gauging site in the susceptor;
a detachable retaining member that either screws together with or is screwlocked into the susceptor, for clamping said temperature-gauging contact in between said retaining member and the susceptor, thereby mechanically pressing upon said temperature-gauging contact to retain it against the temperature-gauging site; and
a sealing member for sealing gastight either an end face of said retaining member opposite where said temperature-gauging contact is clamped, or sealing distal-endwise a tubular member joined to or otherwise furnished integrally with said retaining member.

10. A ceramic susceptor including a temperature gauge as set forth in claim 9, female screws being provided in a surface of the susceptor, wherein said retaining member has, along one end thereof, a flange portion provided with threaded holes for screwlocking said retaining member into the female screws in the susceptor.

11. A ceramic susceptor including a temperature gauge as set forth in claim 9, wherein the retaining member has a through-hole penetrating from one end face to the other end face thereof so that lead lines from the thermocouple can be passed into the through-hole.

12. A ceramic susceptor including a temperature gauge as set forth in claim 9, further comprising a tubular member, either joined to or furnished integrally with an end face of said retaining member opposite where said temperature-gauging contact is clamped, for accommodating lead lines from said thermocouple.

13. A ceramic susceptor including a temperature gauge as set forth in claim 9, wherein the thermal expansion coefficient of said retaining member is about equal to the thermal expansion coefficient of the susceptor.

14. A ceramic susceptor including a temperature gauge as set forth in claim 9, female threads being provided in the susceptor, wherein said retaining member is a circularly cylindrical form having male threads in its lateral surface for screwing said retaining member together with the female threads in the susceptor so that one end face of the retaining member presses said temperature-gauging contact onto the susceptor.

15. A ceramic susceptor including a temperature gauge as set forth in claim 14, wherein the other end face of said circularly cylindrical retaining member has a groove for being turned by a turning tool when said retaining member is screwed together with the susceptor.

16. Semiconductor manufacturing equipment furnished with a ceramic susceptor as recited in claim 9.

\* \* \* \* \*